United States Patent [19]
Williard et al.

[11] Patent Number: 5,895,473
[45] Date of Patent: *Apr. 20, 1999

[54] SYSTEM FOR EXTRACTING TEXT FROM CAD FILES

[75] Inventors: Grant H. Williard, Raleigh, N.C.; Mark G. Winnie, Bristol, Va.; Howard W. Kellogg, Wake Forest, N.C.; Scott R. Ferwerda, Raleigh, N.C.

[73] Assignee: Integrated Industrial Information, Inc., Raleigh, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/514,163

[22] Filed: Aug. 11, 1995

[51] Int. Cl.$^6$ .................................................. G06F 15/00
[52] U.S. Cl. ........................................................ 707/502
[58] Field of Search .................................. 395/792, 793, 395/763, 791; 707/500, 502

[56] References Cited

U.S. PATENT DOCUMENTS

| | | | |
|---|---|---|---|
| 5,191,525 | 3/1993 | LeBrun et al. | 395/792 |
| 5,241,671 | 8/1993 | Reed et al. | 395/792 |
| 5,325,297 | 6/1994 | Bird et al. | 395/792 |
| 5,634,016 | 5/1997 | Steadham, Jr. et al. | 395/329 |

OTHER PUBLICATIONS

Kribbe, "Work Center helps Auto CAD users keep track of documents", *InfoWorld*, v. 16, N. 33, p. 22, Aug. 15, 1994.

"Autodesk Ships Work Center for Windows Jan. 12, 1995", *Newsbytes*, Jan. 12, 1995.

Yegyazarian, "Document manager goes beyond Auto CAD files", *PC Magazine*, v. 13, N. 4, p. 66, Feb. 22, 1994.

Dove, "Collaborative CAD", v. 9, N. 4, p. 119(5), *LAN Magazine*, Apr. 1994.

Puttre, "Data Management Software", *Mechanical Engineering*, vol. 115, p. 10, Nov. 1, 1993.

"AutoManager Work Flow (v. 3.1)", Cyco Intl., Inc., Software Product Specification, Computer Select DB, Dec. 1994.

"Auto Manager Professional (v. 4.37)", Cyco Intl., Inc., Software Product Specification, Computer Select DB, Dec. 1994.

"AutoManager Organizer for DOS and Windows", Cyco Intl. Inc., Software Product Specification, Computer Select DB, Dec. 1994.

*Primary Examiner*—Joseph R. Burwell
*Attorney, Agent, or Firm*—Staas & Halsey

[57] ABSTRACT

Text extracted from computer aided drafting (CAD) files is stored in a receiving database for use in document management. In addition, the textual data stored in the receiving database can be obtained from directory information, constants defined prior to processing the drawings, or pre-existing database(s). The textual data extracted from the CAD files are located by defining an extraction area and comparing the extent of the textual data with the boundaries of the extraction area. Any textual data within the boundaries are stored in a temporary file for transfer to the receiving database.

21 Claims, 7 Drawing Sheets

Microfiche Appendix Included
(4 Microfiche, 374 Pages)

SYSTEM FOR EXTRACTING TEXT FROM CAD FILES

REFERENCE TO MICROFICHE APPENDIX

A source code appendix, submitted with this application on four (4) fiche and 374 total frames, is incorporated by reference herein.

BACKGROUND OF THE INVENTION

1. Field of the Invention

The present invention is directed to data conversion from one format to another and, more particularly, to extraction of textual data from a data structure of a computer aided drafting (CAD) program for input to different software.

2. Description of the Related Art

In the last twenty years, computer-aided drafting (CAD) has gained widespread use in engineering departments and consulting firms throughout the world. Recently, CAD software executing on personal computers has seen increased use. There are likely millions of drawings stored in CAD files. Even within a single company, there may be hundreds or thousands of drawings. Many of these drawings could be reused with little or no changes. However, with such large numbers of drawings many of which may have been produced by someone other than the person needing the drawing, it can be very difficult to locate a desired drawing.

Various attempts have been made to categorize and index drawings. While some of the methods used can be very helpful, the time required to input the data necessary to make these indexing systems work is significant. Existing data input methods make crude attempts to simplify the process, but typically require a great deal of manual input. Programmer's toolkits are available that provide interface routines to CAD files, but no prior art application software is known to exist.

SUMMARY OF THE INVENTION

An object of the present invention is to provide computer software that assists in the extraction of text from existing CAD files.

Another object of the present invention is to provide software tools for specifying what textual information in a CAD file is to be extracted.

A further object of the present invention is to extract data from both freeform text and preformatted text, such as attributes.

Yet another object of the present invention is to combine information obtained from directories, run-time constants and other databases with text extracted from CAD files to generate input to a receiving database.

A yet further object of the present invention is to automatically modify the textual content input to the receiving database using predefined rules.

The above objects are attained by providing a method of extracting textual data from a data structure of a computer aided drafting program, including defining a first extraction area of at least one drawing stored in the data structure of the computer aided drafting program; identifying first textual data stored in the data structure of the computer aided drafting program and located within the first extraction area; and storing second textual data corresponding to the first textual data identified in at least one machine readable record having a predefined format different from the data structure of the computer aided drafting program.

The present invention also can parse or separate data within a single extraction area for storage into more than one field of the database. Since it is a common practice to format title blocks consistently for certain types of drawings, extraction areas can be defined within a title block to extract textual data for storage into different fields of a database. In addition, other sources of information obtained from CAD file directories, run-time constants and other databases can be combined with the text extracted from the CAD files. A mapping process may be used to convert several different spellings or abbreviations of a term into a single consistent term in the receiving database.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIG. 4A is an example of a title block from which textual data can be extracted using a method according to the present invention;

FIG. 4B is a portion of the title block illustrated in FIG. 4A, indicating a text extraction area;

FIG. 4C is another portion of the title block illustrated in FIG. 4A, indicating a text extraction area in a column;

DESCRIPTION OF THE PREFERRED EMBODIMENT

Figure 1:
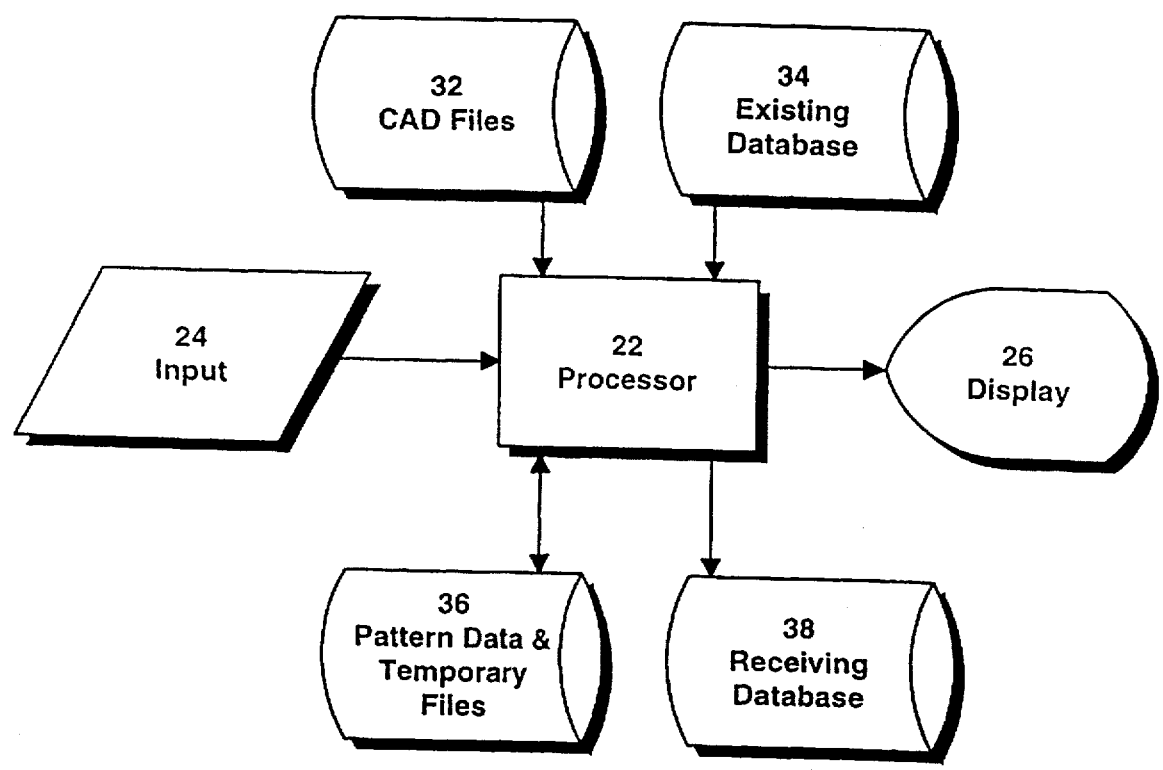
FIG. 1 is a simplified flowchart of a method according to the present invention.

A block diagram of a text extraction system according to the present invention is illustrated in FIG. 1. While only a single processor 22, input device 24 and display 26 are illustrated in FIG. 1, as recognized by one of ordinary skill in the art, the present invention may be applied to a network, a distributed processing system, and many other architectures. Similarly, while the CAD files 32, existing database 34, pattern data 36 and receiving database 38 are illustrated in four separate blocks for purposes of reference, in reality, all four types of data could be stored on a single large disk drive, or distributed over a variety of devices of different types. For example, some of the CAD files 32 might be stored on magnetic tape or other bulk storage media requiring mounting for processing and the temporary files identified in block 36 could be stored in random access memory (RAM), although preferably even the temporary files are stored in non-volatile memory, such as on magnetic disks so that data extraction may occur in stages without concern for loss of electrical power. Although no source of programs is illustrated in FIG. 1, as known in the art, the programs executed by the processor 22 which are described below, may be input from any source of storage, including via the input device 24, stored with any of the data on storage devices 32, 34, 36 or 38, or even in read only memory of any known type.

Figure 2:
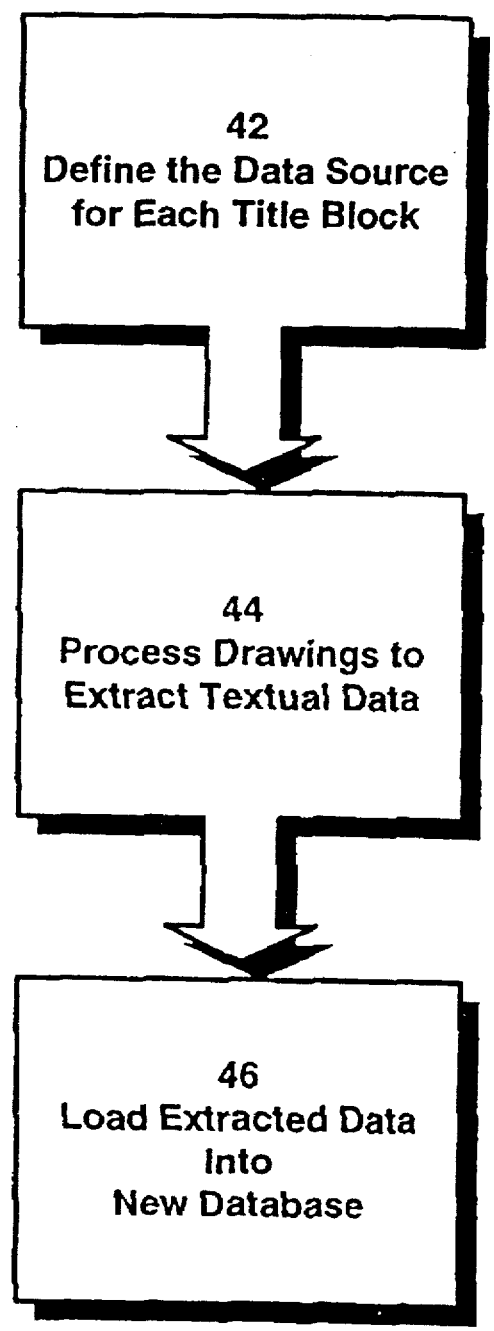
FIG. 2 is a block diagram of a text extraction system according to the present invention.

As illustrated in FIG. 2, there are three basic steps in a program executed by the processor 22 to transfer data from the CAD files 32 to the receiving database 38. These steps may be referred to as definition 42, extraction 44 and storage 46. The first step is to define 42 the data source for each title block or other source of textual data to be extracted from a set of drawings by a user manipulating the input device 24. The second step is to use the definitions created in the first step to extract 44 textual data from a set of drawings matching that definition. The third step is to load 46 the extracted data into the receiving database 38. Each of these steps first will be described in more detail below.

In most organizations using engineering drawings, there are at most about a dozen different formats used for locating textual information that would be extracted into a database for purposes of identifying drawings. Typically, only drawing size, title block placement and title block format need to be taken into account during the definition stage. According to the present invention, computer software provides a graphical interface that assists a user in the process of defining 42 the extraction area for textual data, so that all of the extraction areas for an entire set of drawings can be defined in about a half an hour. If there are similarities between drawings, an existing definition can be duplicated and then edited to reduce the time required to generate definition data for other sets of drawings.

In the preferred embodiment, the pattern data defined in step 42 are generated using a program executing under an operating system which enables textual and graphical data to be manipulated by different programs executing together. For example, the application programming interfaces (APIs), object linking and embedding (OLE) and other tools provided by MICROSOFT WINDOWS 3.1 and higher, enable the novel programs of a method according to the present invention to be used in conjunction with conventional graphical programs to define 42 the pattern data 36. This is preferably accomplished by a WINDOWS client and server. An example of the client is included in the microfiche appendix submitted herewith in the routine legpated.cpp and the related routines, while an example of the server is provided in the routine mutsacad.c and its related routines. Some other routines used by these two programs are also called by other programs in the preferred embodiment and are included in the microfiche appendix after the routines related to mutsacad.c.

Figure 3:
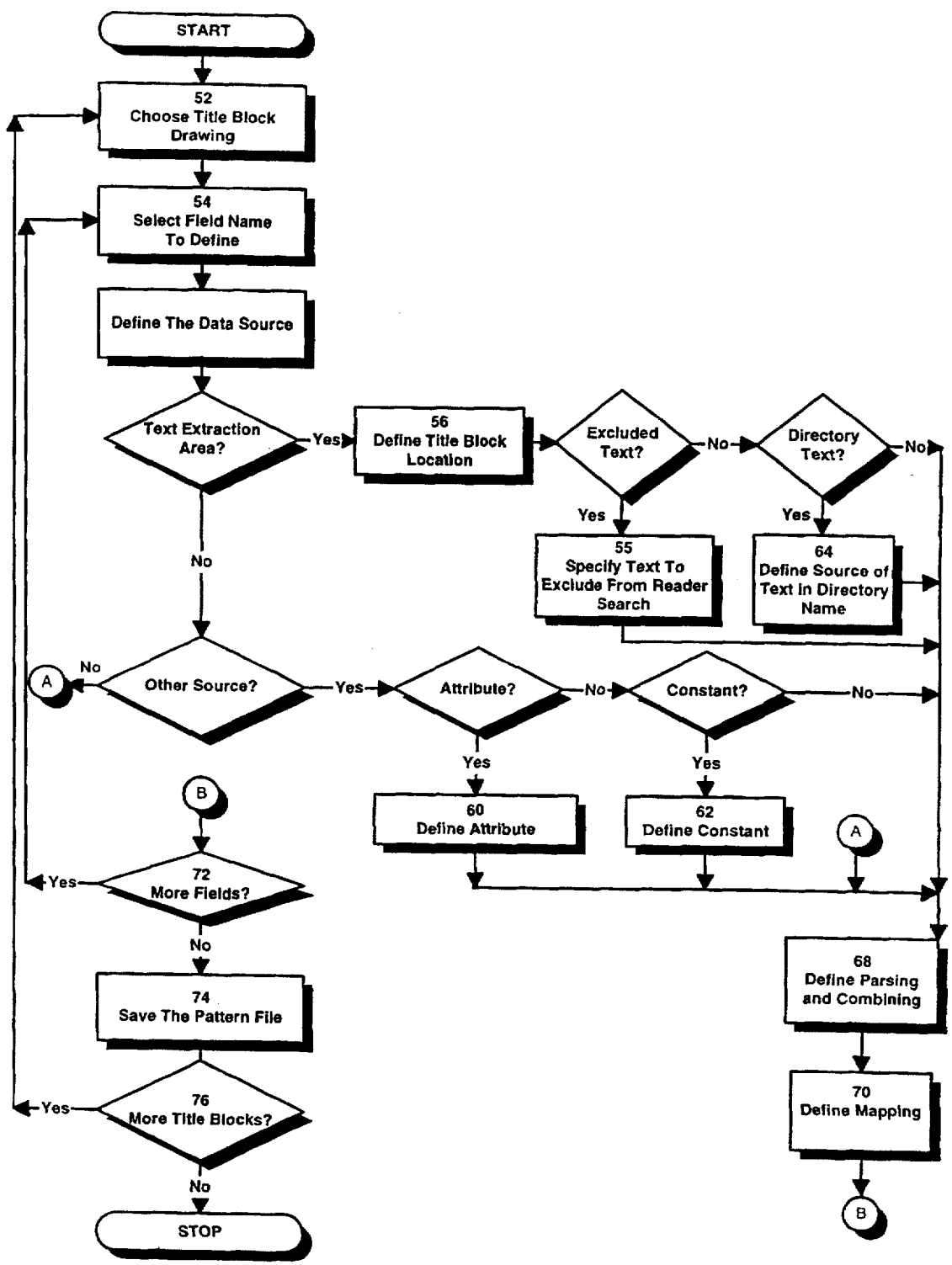
FIG. 3 is a flowchart of a method of defining pattern data according to the present invention.
Figures 4A, 4B, 4C:
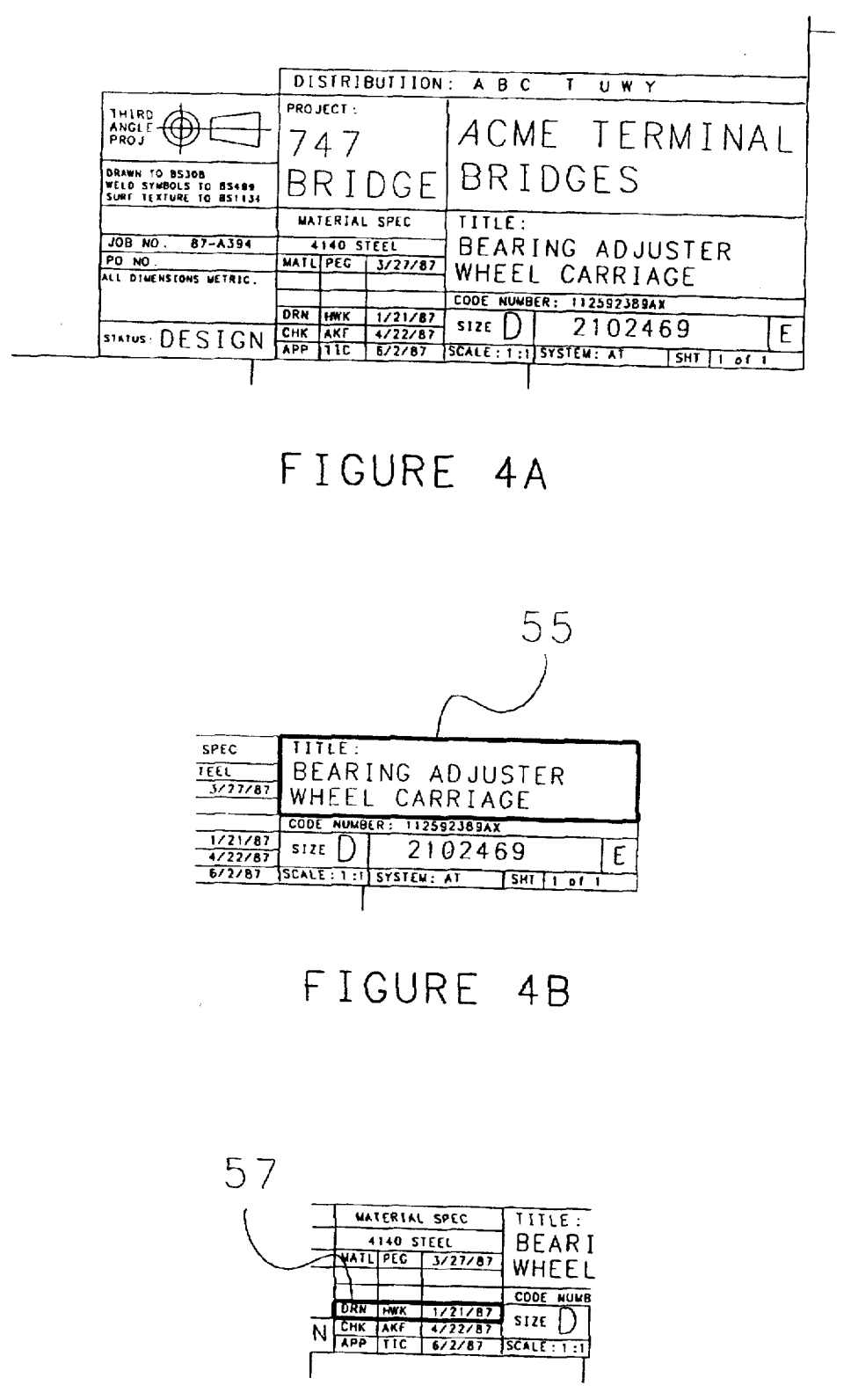

The user interaction with the pattern data definition programs is illustrated in FIG. 3. First, a sample title block for a drawing type is selected 52, e.g., by the function Dmain::cmdActionsSetTitleBlock in legpated.cpp in the microfiche appendix. An example of a title block of an engineering drawing is provided in FIG. 4A. Next, a field within the title block is selected 54 to be defined as a source of data for the receiving database 38, e.g., using the function Dmain::doEdit in legpated.cpp. A text extraction area, such as area 55 in FIG. 4B, may be defined 56 using the graphical tools provided by the CAD software which is accessed via mutsacad.c and the related programs, in particular the function DoEdit in funcs.c in the microfiche appendix. The function MUTIO::Edit is also used in defining the pattern data 36. In addition, the format of the textual data is defined in step 56. For example, the textual data may be defined as in a column, row or two-dimensional matrix. An example of a text extraction area 57 for a column of textual data is illustrated in FIG. 4C.

Conventionally, CAD programs store text using text codes, e.g., the American Standard Code for Information Interchange (ASCII). Therefore, no errors are introduced by the present invention in obtaining textual data from the CAD files 32, as could be the case if a scanner and optical character reader (OCR) software was used.

There may be a considerable amount of text stored with an individual drawing file and it is preferable to not require precise matching of the location of the text. Therefore, the present invention preferably includes the step of defining 58 a string of characters to be excluded when the textual data are extracted from the defined extraction area. For example, in the sample title block illustrated in FIG. 4A, it is easy to define a rectangle in which the title can be found. However, it is not desired to include the word "TITLE". This may be accomplished by routines similar to LDGETN.F in the microfiche appendix.

In addition to what could be called "freeform" text which is associated only with an area on the drawing, conventional CAD software also includes the ability to assign text to graphical information. This text is termed an "attribute" of the graphical information and remains associated with the graphical information when the graphical information is moved from one place to another on the drawing. Thus, text stored as an attribute will be referred to as "preformatted". Since this is an important source of textual information in CAD files 32, preformatted text in an attribute can be defined 60 as a source of textual data using the functions Dmain::DoLoadTitleBlock and Dmain::clickedbtnMore in legpated.cpp, MUTIO::GetAttribs in mutio.cpp and DoGetAttribs in funcs.c in the microfiche appendix.

Other sources of data may also be defined. A constant may be specified 62 if the value of a field in the receiving database 38 will be the same for all records created by this pattern data definition. Text in the name of the directory containing the CAD files 32 from which text will be extracted using pattern data may also be defined 64 as a source of textual data. For example, a project or department name may be included in the directory, but not the title block. This information in the directory can be extracted and stored in the receiving database 38. Similarly, information may be retrieved from the filename. For example, the revision number may be stored in the extension field of the file name. An existing database can also be used as a source of data, but it is defined just before the data is extracted.

In addition to parsing and other string manipulations defined in step 68, a method according to the present invention preferably defines 70 mapping of extracted text to a different text string. The mapping may be defined as taking place at any point during the parsing and combining 68, but in the exemplary embodiment provided by the routines in the microfiche appendix, the mapping defined in step 70 uses a conversion table at the end of the extraction process 44.

The term XREF is used to refer to a type of data that appears in the drawing files of some CAD software that allows another drawing to be inserted at a specified point in the drawing. This is also sometimes referred to as a format overlay. This technique is often used for inserting the lines and constant text of a title block. If the sample drawing selected 52 was a title block referenced by an XREF or format overlay in the drawings, the pattern data are preferably stored in a file with the same name as the title block drawing to simplify the process of selecting the correct pattern for a drawing, as described below.

When the process of obtaining the data for the field selected in step 54 is complete, it is determined 72 whether more fields are to be defined. In the preferred embodiment, if the same field of the title block is used to obtain data for more than one field of the receiving database 38, the pattern data 36 will define the same field of the title block as being used more than once as a source of data. When all the fields have been defined for a pattern, a file containing the pattern data 36 is stored 74 and the user is given an opportunity 76 to define a title block for another set of drawings.

The steps illustrated in FIG. 3 can be performed at any time and the definitions can be edited as necessary. In addition, after one title block has been defined, the pattern data for that title block can be copied and the resulting pattern data edited, to reduce the time required to define another similar title block.

Figure 5:
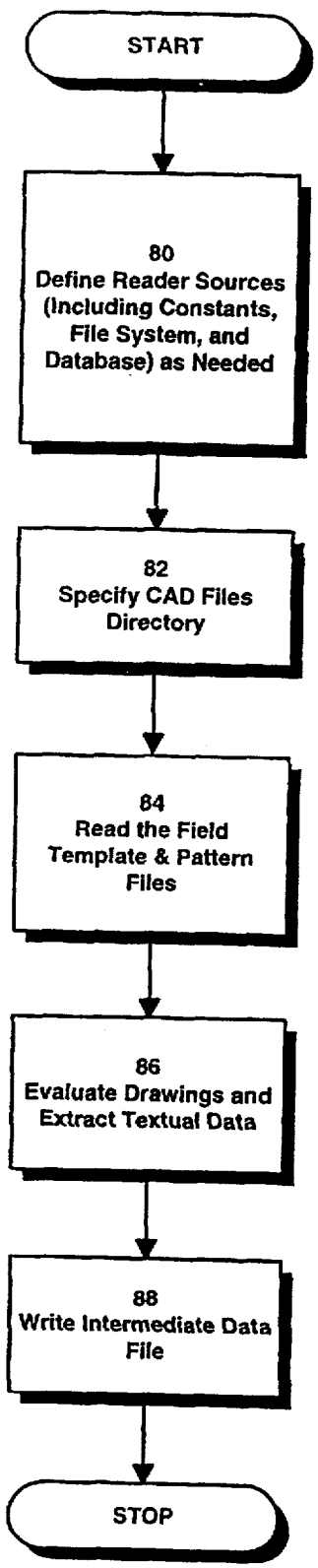
FIGS. 5–6 are flowcharts of the textual data extraction process.

When one drawing type has been completely defined using the process illustrated in FIG. 3, textual data can be extracted using the pattern data. First, run-time information, such as constants, existing databases, etc. are defined 80, as illustrated in FIG. 5, by user manipulation of the input device 24 (FIG. 1). When an existing database is used as a source of data, the name and location of the database are specified 80. In addition the name of the field containing the drawing document name and the name of the field containing the data to be extracted are also defined 80. This is accomplished by the DdataBase routine in legreadr.cpp in the microfiche appendix.

Next, the directory in which to start accessing CAD files is specified 82. Included in this specification 82 is whether to access subdirectories. The file system definition in step 80 may include which level of subdirectory should be used as a data source for textual data to be stored in the receiving database 38. The pattern data and a field template are read 84, including any conversion tables that are required to perform mapping of text obtained from a data source into text stored in the receiving database 38. Using the data obtained in steps 80, 82 and 84, drawings are evaluated 86 to extract textual data and, preferably, an intermediate file is written 88.

Figure 6:
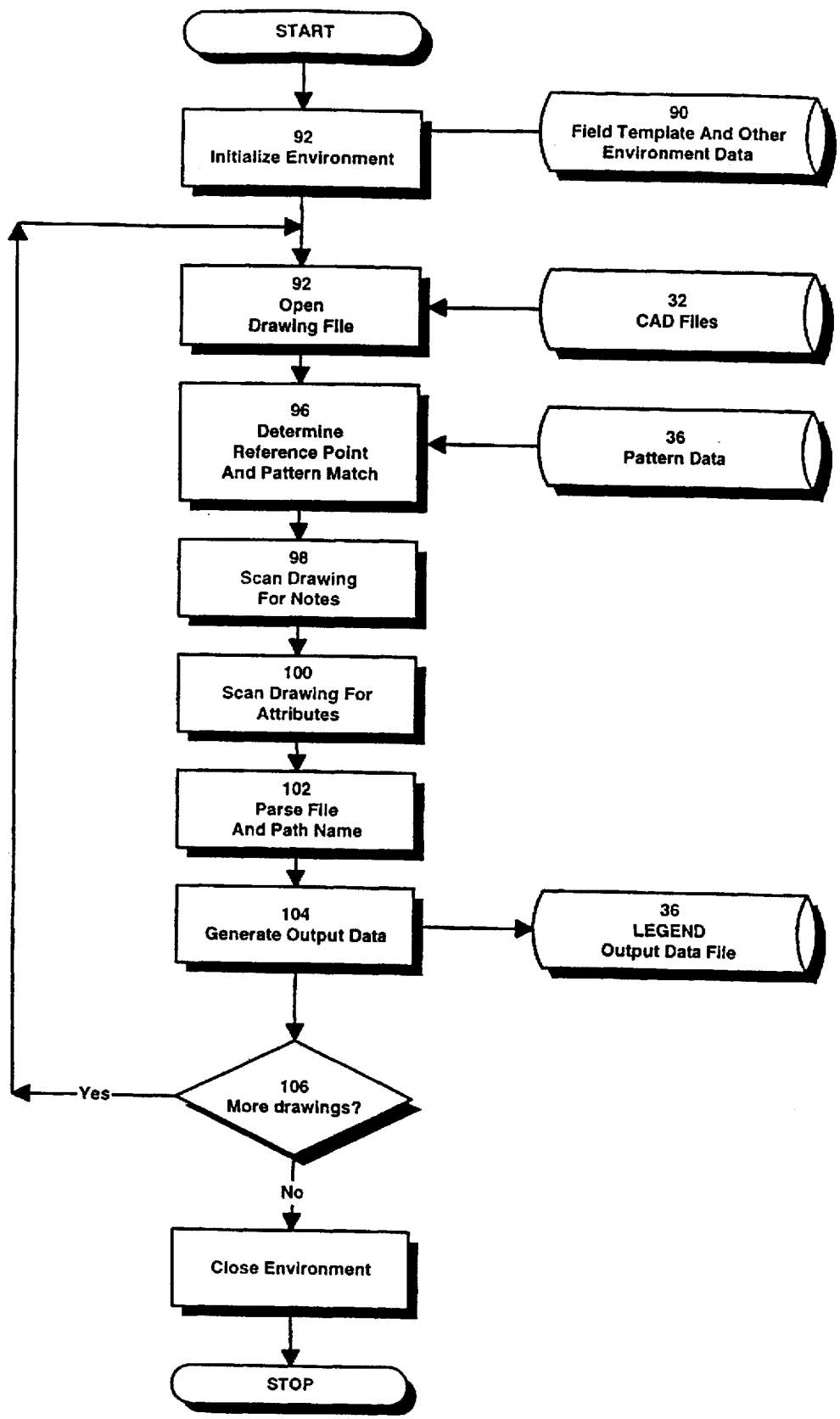

The textual extraction process 86 is illustrated in more detail in FIG. 6. The programs in the exemplary embodiment provided in the microfiche appendix beginning with the module extract.c and following thereafter, may be used to perform the steps illustrated in FIG. 6. In FIG. 6, the preliminary steps 80, 82 and 84 are shown as a single block referring to initialization 90 of the environment using the field template and other environment data 92 previously stored. Creation of the field template has not been described, because it is dependent upon the receiving database. One way of obtaining the field template is to access its database structure. This is a well known process for files using dBASE III format. The structure of databases using other formats can typically be accessed using information available from the database designer or publisher.

In the exemplary embodiment provided in the microfiche appendix, the routine Process_Files is executed to access the directory specified by the user and calls the routine Count_Files in the module extract.c to count the number of files to be processed as part of the initialization 90. The remainder of the initialization 90 is performed by the FORTRAN routine LDINIT which calls SCINIT to initialize special characters that may appear in drawings.

When the initialization 90 is completed, a loop is entered to process the drawings in the CAD files 32 (FIG. 1). In the routines in the microfiche appendix, most of the operations in the loop illustrated in FIG. 6 are performed by the FORTRAN routine LDEXTR which is called by the routine Run_Extract in extract.c. The routine LDEXTR opens 94 one of the CAD files 32 by calling ldopen.c. The routine ldopen.c determines 96 a reference point for the title block using the pattern data 36 defined by the routines illustrated in FIG. 3.

In ldopen.c, if an XREF is stored in the CAD file for the title block, the XREF will provide the reference point and it is easy to determine 96 the correct pattern data file to use. If the preferred naming convention described above is used, the name contained in the XREF entity data in the drawing opened in step 94 will identify the pattern to be used for extracting textual data.

If XREF is not used for the title block of the drawing, it is more difficult to determine 96 the reference point and pattern match. In the exemplary embodiment provided by the routines in the microfiche appendix, LDFMT is executed to make the determination 96. First, LDLDPT compares all of the text obtained from the drawing with excluded text in the patterns and for each pattern averages the coordinates used by the matching text strings after offset by the difference between the reference point for the pattern and the reference point for the excluded text. In this way the reference points for all of the patterns are stored in the arrays XORG and YORG by LDLDPT. Occasionally, a text string matches an excluded text string, but is not from the title block. Therefore, the reference point calculated from this text string will be significantly different from the reference points calculated from the other text strings. In this case, the text string is removed from the above averaging and is not used in calculating the final reference point.

Next, LDFMT compares all of the text entities in the drawing file with text stored in the pattern file. The text in the drawing file is obtained from text entries in the entity section of the drawing file opened in step 94. There may be "blocks" of text and graphics in the drawing file, outside the area that is printed, which may be used multiple times in the drawing. The text entries in any such blocks are obtained by the ldnxtn.c routine in the microfiche appendix.

Pattern matching 96 is performed to select the pattern most closely matching the drawing opened in step 94. The textual data in the drawing are retrieved one text string at a time by the routine ldnxtn.c in the microfiche appendix. The amount of the text within the text extraction area defined by each pattern, using the reference points obtained from LDLDPT, may be determined by calling the function NOTBOX. One of two values is returned by NOTBOX: one (1) if part of the text string is included within the text extraction area, and two (2) if all of the text string is outside of the text extraction area. The returned value is assigned to SIMFAC which is accumulated in the array FMTSIM for each pattern. If an attribute in the drawing matches an attribute in the pattern, the value of FMTSIM is incremented by 2 for that pattern. A percent similarity PCTSIM is calculated for each pattern by dividing the accumulated similarity by twice the total number of attributes and excluded text in the pattern. Thus, the pattern number and the reference point of the pattern with the maximum similarity can be returned to LDEXTR via LDOPEN. If this pattern has a percent similarity less than a predetermined amount, such as 50 percent, the drawing may be noted as an exception and the next drawing opened 94. If an excessive number of drawings are found that do not match, execution may be interrupted so that additional pattern(s) can be added, or a routine written specifically for the drawings being processed may be executed to determine a pattern to be used.

Next, the drawing opened in step 94 is again scanned 98 for textual data to determine the amount of textual data within a text extraction area defined by the pattern data of the pattern most closely matching the drawing. In the microfiche appendix, the routine LDGETN is used for this purpose. The text strings are retrieved one at a time from the drawing file by the routine ldnxtn. The function NOTBOX is used to determine whether the text string is within the text extraction area defined by the pattern data. The X and Y coordinates of one corner of the text string and font information are returned by ldnxtn and NOTBOX calls CHRWID to determine the diagonally opposite corner based on the font information and tables defining how the font characteristics determine the size of characters. The portion of the text string within the defined text extraction area is returned by NOTBOX to determine if it matches text to be excluded for that pattern. Text that is not excluded is placed into a working array, together with the location of the text string. This is performed by a routine LDADDO in the microfiche appendix. If there are multiple lines related to the same field, each line will be stored as a separate element of the array ARROUT. Later, the elements will be combined as described below.

It is common on engineering drawings to provide information in one-or two-dimensional arrays. In particular, revision information is commonly shown, including revision date and who revised the drawing. Other information may also be included. There are typically only a few basic variations in the format. As described above, when the pattern data are being created the description of the data source includes format information. If information is stored in a column or row, the location of the text is found as precisely as possible and this information is saved. The routine LDENCL finds the smallest box that encloses a text string, so that the array location can be determined. If the text string located by LDENCL is after any previously detected text string in that column or row, the text string is stored in the output array. As a result, when processing of the drawing is completed, the last text string in the column or row will be stored in that element of the array. An example of this is provided for columns in LDGETN in the microfiche appendix. Similar logic would be used for rows and two dimensional matrices with either row or column precedence defined by the data type.

As described above, in addition to textual data in the drawing file, the present invention is able to input other information into the receiving database 38. As indicated in LDEXTR, although text is extracted from a drawing only if a pattern with sufficient similarity is found in ldopen.c, for all drawings run-time constants will be stored in the working array by LDGETM. If a pattern was located, prior to storing run-time constants, constants in the pattern are output to the working array. Also, if there are attributes in the drawing, LDGETM calls LDGETA to scan 100 for attributes located within the text extraction area and store the attributes into the working array. Also, if a pattern was matched in step 96, or run-time instructions were provided to obtain 102 textual data from the directory information of the CAD files 32, such as directory name or pathname, filename, date created, etc., this information is stored in the working array by LDGETF. Similarly, rddbrc in the microfiche appendix obtains textual data from an existing database to be stored in the working array. For all sources of data, data validation may be performed where the pattern data specify that a field is to contain certain types of data, such as integers, floating point numbers, dates, etc.

When all data sources have been used to store in the working array the textual data associated with the file opened in step 94, an intermediate output record is created 104. In the exemplary embodiment provided by the routines in the microfiche appendix, this is performed by the routine LDMAKA. If the pattern data specify that the textual data should be parsed, appropriate parsing operations are performed. If a map table is included, the textual data in the working array are compared with entries in the map table to convert textual data matching an entry to new textual data which are stored in the working array in place of the matched textual data. The parsing may include separating data in one element of the working array into two or more elements in the output array, or storing only part of the text in one element of the input array into the output array.

The resulting output array is stored 104 in a temporary file 36 with a header identifying the field in which the data is to be stored. If more drawings 106 need to be processed, processing continues by opening the next drawing file. Otherwise, the open files are closed. The temporary file created by step 104 is preferably stored on a disk as indicated in FIGS. 5 and 6, so that the final stage of processing can be performed any time after the processing illustrated in FIG. 6 ends.

Figure 7:
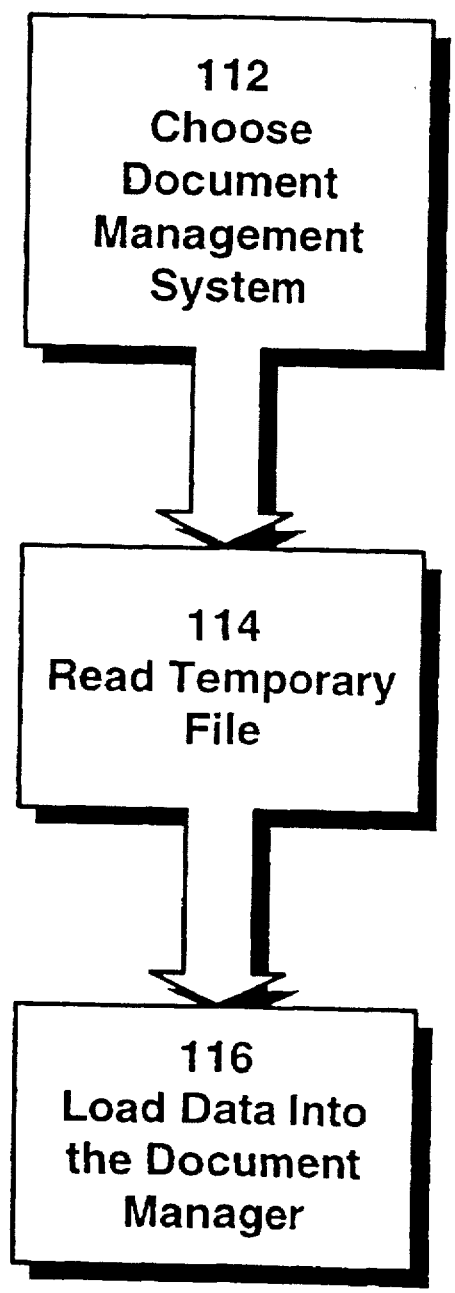
FIG. 7 is a flowchart for storing data in the receiving database.

The final stage of processing is illustrated in FIG. 7. The only formatting of textual data that is performed in the final stage is that which is required for the document management system which will use the receiving database. Exemplary routines are not provided in the microfiche appendix for the final stage of processing, since they are primarily dependent on the document management system chosen 112. There are no unusual requirements to read 114 the temporary file 36 created by repeatedly executing step 104. It is conventional for document management systems to provide a way for one of ordinary skill in the art to load 116 the data in the temporary file 36 into the receiving database 38. This may be done by an import command in the document management system, or by a separate program, or by defining the file structure so that one of ordinary skill can write a program for this purpose.

The many features and advantages of the present invention are apparent from the detailed specification and thus, it is intended by the appended claims to cover all such features and advantages of the system which fall within the true spirit and scope of the invention. For example, although exemplary routines are provided in the microfiche appendix, the present invention is not limited to an embodiment using these routines. Further, numerous modifications and changes will readily occur to those skilled in the art from the disclosure of this invention; thus, it is not desired to limit the invention to the exact construction and operation illustrated and described. Accordingly, simply modifications and equivalents may be resorted to, as falling within the scope and spirit of the invention.

What is claimed is:

1. A method of extracting textual data from a data structure of a computer aided drafting program, comprising the steps of:

(a) defining a first extraction area of at least one drawing stored in the data structure of the computer aided drafting program;

(b) identifying first textual data stored in the data structure of the computer aided drafting program and located within the first extraction area; and (c) storing second textual data corresponding to the first textual data identified in step (b) in at least one machine readable record having a predefined format different from the data structure of the computer aided drafting program.

2. A method as recited in claim 1, wherein said identifying in step (b) identifies both freeform text and preformatted text stored in the data structure of the computer aided drafting program and located within the first extraction area.

3. A method as recited in claim 1, wherein the data structure of the computer aided drafting program is stored in at least one file, having a filename, in at least one directory, each directory having a pathname, further comprising the step of (d) obtaining third textual data from at least one of the filename and the pathname, and wherein step (c) includes storing the second textual data based upon both the first textual data and the third textual data.

4. A method as recited in claim 1, further comprising the step of (d) establishing rules, prior to said identifying in step (b) and said storing in step (c), for converting the first textual data into the second textual data for the first extraction area defined in step (a), and wherein said storing in step (c) converts the first textual data into the second textual data in dependence upon the rules established in step (d).

5. A method as recited in claim 4, wherein the rules established in step (d) include exclusion of at least one string of characters in the first textual data from the second textual data stored in step (c), if the at least one string of characters is identified in step (b).

6. A method as recited in claim 4, wherein the rules established in step (d) include changing the first textual data into the second textual data in dependence upon a conversion table.

7. A method as recited in claim 4, wherein the rules established in step (d) include parsing rules for separating the first textual data identified in step (b) into at least third and fourth textual data, and wherein said storing in step (c) stores the third and fourth textual data in different fields of the at least one machine readable record.

8. A method as recited in claim 1, wherein said identifying in step (b) is repeated to identify all text in the first extraction area of each of a plurality of drawings, and wherein said storing in step (c) stores a plurality of machine readable records, at least one of the machine readable records stored for each of the drawings.

9. A method of automatically inputting data into a receiving computer database, comprising the steps of:

(a) extracting any freeform text identified within a predefined extraction area of a drawing file of a computer aided drafting program;

(b) extracting any preformatted text within the predefined extraction area of the drawing file of the computer aided drafting program;

(c) storing a record in the receiving computer database, containing output text based on at least one of the freeform text and the preformatted text extracted in steps (a) and (b), respectively.

10. A method as recited in claim 9, wherein the drawing file has a filename and is stored in a directory of a data storage device having a pathname, wherein said method further comprises the step of (d) extracting at least one of the pathname and the filename of the drawing file prior to said storing in step (c), and wherein said the output text stored in the record of the receiving computer database is also based on the at least one of the pathname and the filename of the drawing file.

11. A method as recited in claim 9, wherein the at least one of the freeform text and the preformatted text extracted in steps (a) and (b), respectively, is converted into the output text in step (c) in dependence upon a conversion table.

12. A method as recited in claim 9, further comprising the step of (d) establishing, prior to said extracting in steps (a) and (b) and said storing in step (c), parsing rules for separating the at least one of the freeform text and the preformatted text extracted in steps (a) and (b), respectively, into at least first and second textual data, and wherein said storing in step (c) stores the first and second textual data in different fields of the receiving computer database.

13. A method as recited in claim 9, wherein said extracting in steps (a) and (b) is repeated to identify all text in the predefined extraction area of each of a plurality of drawing files, and wherein said storing in step (c) stores a plurality of records in the receiving computer database, at least one of the records stored for each of the drawing files.

14. A method as recited in claim 9, further comprising the step of (d) extracting related information from another computer database having a structure different than the receiving computer database, the related information being associated with the drawing file, and wherein said storing in step (c) includes storing the related information in the record containing the output text based on at least one of the freeform text and the preformatted text.

15. A method of extracting textual data from a plurality of drawing files created by a computer aided drafting program, comprising the steps of:

(a) defining at least one drawing type corresponding to a set of the drawing files;

(b) defining at least one extraction area for each drawing type;

(c) identifying first textual data located within each extraction area in each drawing file in the set of the drawing files; and (d) storing second textual data, corresponding to the first textual data identified in step (b), in records of a computer database.

16. A method as recited in claim 15, wherein said identifying in step (c) identifies both freeform text and preformatted text stored in the data structure of the computer aided drafting program and located within the at least one extraction area, and wherein said method further comprises the step of (e) establishing rules, prior to said identifying in step (c) and said storing in step (d), for converting the first textual data into the second textual data for each extraction area, the rules including designation of at least one string of characters in the first textual data to be excluded from the second textual data, if the at least one string of characters is identified in step (c).

17. A method as recited in claim 16, wherein the rules established in step (e) include parsing rules for separating the first textual data identified in step (c) into at least third and fourth textual data, and wherein said storing in step (d) stores the third and fourth textual data in different fields of at least one record in the computer database.

18. An apparatus for extracting textual data from a data structure of a computer aided drafting program, comprising:

definition means for defining an extraction area of at least one drawing stored in the data structure of the computer aided drafting program;

identification means for identifying first textual data stored in the data structure of the computer aided drafting program and located within the extraction area; and storage means storing second textual data corresponding to the first textual data identified by said identification means in at least one machine readable record having a predefined format different from the data structure of the computer aided drafting program.

19. An apparatus for automatically extracting data from drawing files created by a computer aided drafting program and storing records in a computer database in dependence on the data extracted from the drawing files, said apparatus comprising:

at least one input device to receive definition data defining an extraction area of at least one drawing type corresponding to a set of the drawing files and at least one extraction area for each drawing type;

at least one processor, coupled to said at least one input device, to identify first textual data located within each extraction area in each drawing file in the set of the drawing files; and at least one storage unit, coupled to said at least one processor, to store the definition data and the computer database, including second textual data corresponding to the first textual data identified by said at least one processor.

20. A method of extracting textual data from at least one computer file containing at least one drawing in a vector format, comprising:

defining an extraction area of the at least one drawing in the at least one computer file;

identifying first textual data located within the first extraction area; and storing second textual data, derived from the first textual data, in at least one computer record separate from the at least one computer file.

21. A computer-readable medium encoded with at least one computer program for extracting textual data from at least one computer file containing data in a vector format, said at least one computer program comprising instructions for:

defining an extraction area of the data in the at least one computer file;

identifying first textual data located within the extraction area; and storing second textual data, derived from the first textual data, in a textual format.

* * * * *